United States Patent Office 2,893,874
Patented July 7, 1959

2,893,874

SALAD DRESSING

Ira M. Le Baron, Evanston, Ill., assignor to International Minerals & Chemical Corporation, a corporation of New York No Drawing. Application February 27, 1957
Serial No. 642,662

7 Claims. (Cl. 99—144)

This invention relates to salad dressings, and more particularly to a novel dressing having interesting and distinctive taste characteristics.

The most commonly employed dressing for salads, cooked vegetables, and the like is "French" dressing, which consists basically of a mixture of an edible oil, a vinegar, salt, and pepper. The basic recipe can be modified by addition of garlic, onion, cream, celery salt, egg, cheese, tomato sauce, Worcestershire sauce, herbs, and the like to yield, for example, Italian dressing, cream salad dressing, sour cream dressing, cooked salad dressing, blue cheese dressing, tomato sauce dressing, Thousand Island dressing, mayonnaise, and many others. In all cases, the flavor of the composite mixture is a combination of the tart and pungent flavor of acetic acid, modified by the oil and by the added seasonings.

I have now made a fundamental modification in the salad dressings of the prior-art type, wherein vinegar is replaced with an aqueous glutamic acid solution. The result is a dressing of novel and distinctive flavor.

My new salad dressing comprises essentially an edible oil, seasonings, and an aqueous glutamic acid solution having a pH between about 2 and about 2.6, the proportion of such solution being sufficient to incorporate between about 0.05 and about 0.5 percent by weight of glutamic acid in the dressing, based on the total weight thereof.

A glutamic acid solution suitable for use in my invention can conveniently be prepared by commingling glutamic acid with water and acidifying to the desired pH level with an "edible" inorganic acid—i.e., an acid acceptable for use in food products. Satisfactory acids include hydrochloric acid, orthophosphoric acid, sulfuric acid, and the like. In water alone, glutamic acid is almost entirely insoluble; but the addition of inorganic acid permits glutamic acid to form a solution of satisfactory concentration, presumably through salt formation with the inorganic acid. The solution should contain between about 0.5 and about 2.5% by weight of glutamic acid substance, calculated as glutamic acid, preferably around 1%.

Alternatively, an edible glutamate salt, such as monosodium glutamate, monopotassium glutamate, monoammonium glutamate, monocalcium diglutamate, or the like, can be similarly acidified to prepare a glutamic acid solution. As a further alternative, an acid salt of glutamic acid, such as glutamic acid hydrochloride, can be used instead of the inorganic acid. In the latter embodiments, an inorganic salt is simultaneously produced in the solution. Such a salt must of course be tolerable in food products, and due allowance must be made therefor in the seasoning mixture employed in the preparation of the dressing.

In preparing my dressings, it is especially convenient to employ dry glutamic acid formulations which, when dissolved in water to a proper concentration, afford a glutamic solution of the desired pH. Such dry mixtures may be made by appropriate admixture of crystalline glutamic acid, glutamate salts, and acid salts of glutamic acid, as illustrated below in the operating examples.

In another highly advantageous embodiment of the invention, a dry glutamic mixture of the aforesaid type is combined with a dry mixture of seasonings, yielding a base stock which is readily converted into a salad dressing by simple addition of edible oil and water.

The preferred form of the invention employs glutamic acid alone as the organic acidic constituent. In another embodiment, glutamic acid is used in combination with vinegar. In all cases, the proportion of glutamic acid should not exceed about 0.5% by weight, and the glutamic acid content must be considered in determining the total quantity of acid to suit the individual taste.

The techniques employed in the preparation of salad dressings are old and well-known in the art, and form no part of my invention. Thus, I may add emulsifying agents, such as alginate, and I may employ homogenization or other means to disperse and stabilize my product in the form of a uniform emulsion.

The following specific examples will more clearly illustrate my invention.

*Example 1.—French dressing*

A glutamic solution having a pH of 2.3 was prepared by dissolving 0.6 g. of glutamic acid and 1.02 g. of glutamic acid hydrochloride in 100 ml. of water. This solution was used instead of vinegar in an otherwise conventional French-type dressing, prepared according to the following recipe:

0.15 g. dry mustard
0.75 g. celery salt
0.10 g. black pepper (coarse)
1.5 g. salt
2.0 g. sugar
Pinch of thyme
120 ml. salad oil
80 ml. glutamic solution The dry ingredients were thoroughly mixed. The glutamic solution was added and blended. Finally, the oil was added and the mixture was well shaken. The product gave a pleasing and distinctive flavor to tossed salad.

*Example 2.—Modified French dressings*

French dressings were prepared as in Example 1, modified in one case by adding blue cheese, and in another case by adding tomato catsup. The product in each case had an interesting and distinctive flavor.

*Example 3.—Mayonnaise*

A mayonnaise-type dressing was prepared according to the following recipe, using a glutamic solution as in Example 1 instead of vinegar:

0.6 g. dry mustard
1.5 g. sugar
1.5 g. salt
Few grains white pepper
1 fresh egg yolk
180 ml. salad oil
15 ml. glutamic solution The dry ingredients were mixed. The egg yolk was added and blended in. The glutamic solution was added in two portions and mixed. Finally, the oil was added very slowly with thorough mixing.

The product had a somewhat deeper color and thinner consistency than conventional mayonnaise dressings, and had a lingering nut-like taste.

*Example 4.—Dry glutamic mixtures*

*Type A.*—Crystalline glutamic acid (128.5 g.) was commingled with crystalline glutamic acid hydrochloride (325.5 g.). This mixture dissolved readily in the proportion of 5 grams to one pint of water, yielding a glutamic solution suitable for use in my invention.

Type B.—Crystalline glutamic acid hydrochloride (246.5 g.) was mixed with dry, finely divided $$NaH_2PO_4.H_2O$$

(207.5 g.) The resulting mixture dissolved readily in the proportion of 8.7 grams to one pint of water, yielding a vinegar substitute.

Type C.—Crystalline glutamic acid hydrochloride (200 g.) was mixed with crystalline monosodium glutamate (50 g.). The mixture obtained thereby dissolved readily in the proportion of 5 grams to one pint of water, and the resulting solution was a piquant replacement for vinegar in salad dressings.

Type D.—A mixture of crystalline glutamic acid hydrochloride and monocalcium phosphate in 50:63 weight ratio dissolved readily in water in the proportion of 10.7 grams per pint and yielded a solution having a pH of 2.2, useful as a vinegar substitute.

*Example 5.—Dry base stocks*

Each of the dry glutamic mixtures of Example 4, when commingled with the dry seasonings mixture of Example 1 in 1:3.5 weight ratio, yields a base stock which is readily converted into a salad dressing by addition of 25 parts by weight of salad oil and 18 parts of water per part of said base stock.

The effective and preferred form of glutamic acid and of its derivatives for use in my novel compositions is the L-form, the D-form being relatively bland and useful mainly as a carrier of inorganic acid for adjusting the relative intensities of acidic and L-glutamic tastes. Thus, while I may include the D-form in my compositions (e.g. in the form of the racemic mixture), I prefer, for reasons of economy, to use the L-form alone.

In describing my invention, I have employed the terms "glutamic solution" and "glutamic acid solution" to designate aqueous solutions of pH 2–2.6 containing glutamic acid and an edible inorganic acid. Such solutions, of course, comprise an equilibrium mixture of glutamic acid, inorganic acid, and the inorganic acid salt of glutamic acid, and my uses of the terms "glutamic solution" and "glutamic acid solution" are to be interpreted as referring to such mixtures.

While I have described my invention with reference to certain specific examples, it is to be understood that such examples are illustrative only and not by way of limitation. Thus, my new composition may be modified in a variety of ways by adding one or more seasoning or flavoring substances, by adding emulsifiers and/or stabilizers, by cooking, blending, or homogenizing, or by treating the composition in other ways known to the salad dressing art. These and other modifications of the invention will be apparent from the foregoing description to those skilled in the art.

In accordance with the foregoing description, I claim as my invention:

1. A dressing for salads which comprises essentially an edible oil, seasonings, and between about 0.05 and about 0.5% by weight of L-glutamic acid, based on the complete mixture, in the form of an aqueous solution of L-glutamic acid and an edible inorganic acid salt of L-glutamic acid, said solution having a pH between about 2 and about 2.6.

2. The composition of claim 1 wherein said aqueous solution contains L-glutamic acid substance in a concentration between about 0.5 and about 2.5% by weight, calculated as L-glutamic acid.

3. The composition of claim 1 wherein said salt is L-glutamic acid hydrochloride.

4. The composition of claim 1 wherein said salt is an L-glutamic acid orthophosphate.

5. The composition of claim 1 wherein said solution is prepared from an edible L-glutamate salt and an edible inorganic acid.

6. The composition of claim 5 wherein said salt is monosodium L-glutamate and said edible inorganic acid is hydrochloric acid.

7. A salad dressing base stock in dry form which comprises essentially a dry seasoning material and a dry mixture of materials affording an L-glutamic acid solution having a pH between about 2 and about 2.6 on being dissolved in water, said mixture comprising an edible inorganic acid salt of L-glutamic acid, and another substance selected from the group consisting of L-glutamic acid and edible L-glutamate salts.

References Cited in the file of this patent

UNITED STATES PATENTS

| | | |
|---|---|---|
| 1,680,865 | Fujii | Aug. 14, 1928 |
| 2,170,518 | Musher | Aug. 22, 1939 |
| 2,500,919 | Cahn | Mar. 21, 1950 |